US008931244B2

(12) United States Patent
Gola

(10) Patent No.: US 8,931,244 B2
(45) Date of Patent: Jan. 13, 2015

(54) HORSE BOOT ASSEMBLY

(75) Inventor: Andrea Gola, Milan (IT)

(73) Assignee: Osca 2 S.R.L., Olgiate Molgora (Lecco) (IT)

( * ) Notice: Subject to any disclaimer, the term of this patent is extended or adjusted under 35 U.S.C. 154(b) by 0 days.

(21) Appl. No.: 12/678,691

(22) PCT Filed: Oct. 18, 2007

(86) PCT No.: PCT/IT2007/000729
§ 371 (c)(1),
(2), (4) Date: May 7, 2010

(87) PCT Pub. No.: WO2009/050750
PCT Pub. Date: Apr. 23, 2009

(65) Prior Publication Data
US 2010/0229508 A1    Sep. 16, 2010

(51) Int. Cl.
*A01L 3/00* (2006.01)
*A01L 5/00* (2006.01)
*A01K 13/00* (2006.01)
(52) U.S. Cl.
CPC .................................... *A01K 13/007* (2013.01)
USPC .................................. 54/82; 168/18; 36/111

(58) Field of Classification Search
USPC .............................. 54/82; 168/18, 22; 36/111
See application file for complete search history.

(56) References Cited

U.S. PATENT DOCUMENTS

| 4,736,800 | A | * | 4/1988 | Rohner ........................... 168/18 |
| 5,588,288 | A | * | 12/1996 | Origgi et al. ..................... 54/82 |
| 5,661,958 | A | | 9/1997 | Glass et al. |
| 2003/0167739 | A1 | * | 9/2003 | Clark et al. ....................... 54/82 |
| 2006/0162296 | A1 | * | 7/2006 | Maestrini .......................... 54/82 |
| 2007/0113524 | A1 | * | 5/2007 | Lander .............................. 54/82 |

FOREIGN PATENT DOCUMENTS

| GB | 2010064 A | 6/1979 |
| WO | 00/16614 A | 3/2000 |

* cited by examiner

*Primary Examiner* — Peter M Poon
*Assistant Examiner* — Kathleen Alker
(74) *Attorney, Agent, or Firm* — Lucas & Mercanti, LLP

(57) ABSTRACT

A horse boot assembly includes: a boot body shaped to accommodate a hoof of a horse, a fastening device associated with the boot body for fastening the boot assembly onto the hoof, and an adapter. The adapter is compressed against a rear part of the hoof upon fastening of the fastening device.

32 Claims, 13 Drawing Sheets

HORSE BOOT ASSEMBLY

CROSS-REFERENCE TO RELATED APPLICATION

This application is a 371 of PCT/IT2007/000729 filed Oct. 18, 2007, the contents of which are incorporated herein by reference.

FIELD OF THE INVENTION

The present invention refers to a horse boot assembly to be applied to hooves of a horse, in particular, but not exclusively, shoed hooves.

PRIOR ART

It is known the use of horse boots to protect the hooves and, in general, the feet of a horse. Such horse boots can be used both for hooves without with horseshoes and/or hooves affected by pathologies, and for shoed hooves.

In particular, in case of shoed hooves and in the absence of specific pathologies, horse boots perform various advantageous functions. For example, in case of hard (dirt patch, asphalt, concrete), stony or uneven surfaces, the horse boots allow to damp the impact of the feet against the ground, thus substantially limiting danger of contusion traumas of the hoof. In case of work on sandy surfaces, they allow to reduce the pressure to which hooves, particularly the front hooves when they contact the ground upon impact after a jump, are subjected due to the filling of the frog with sand. In case of work on snowy surfaces, horse boots substantially eliminate the problem of accumulation of compressed snow in the frog.

The design of any horse boot must take into account both the particular shape of the hooves, substantially rounded and without relevant undercuts, and the high forces released on them each time the feet contact the ground. Both factors make it difficult to establish and/or maintain a firm connection between the horse boot and the hoof when the horse is at work. A not sufficiently firm connection can cause unwanted movements between the horse boot and the hoof during use, up to the point of detachment of the horse boot and consequent loss thereof.

The horse boots of the prior art, in particular those for the use with shoed hooves, attempted to solve these problems in various ways.

For example, patent EP 0 651 943 discloses a horse boot made of an elastomeric flexible material comprising a sole and an upper integrally formed. In the internal rear part, between the sole and the upper, housings are formed for the ends of the bars of a horseshoe associated with the hoof. The engagement of the horse boot with the wall of the hoof at the front and with the ends of the bars of the horseshoe at the rear allows to obtain a connection between the horse boot and the hoof. However, in order to guarantee firmness of such connection, the shape and the size of the horse boot must be precisely adapted to the shape of the hoof. This makes application and removal of the horse boot difficult, especially when, because of the use, the elastomeric material loses its initial flexibility.

U.S. Pat. No. 5,661,958 discloses a horse boot comprising a sole, a flexible upper adapted to envelope the hoof of a horse and fastening means to secure the horse boot to the hoof. The fastening means comprise a strap arranged at the rear internal part of the boot and free to slide with respect to the upper, and a pulling system associated with the strap. Once the horse boot has been applied onto the hoof, by means of the pulling system the strap is pulled parallel to the sole until it comes into contact with the rear part of the hoof, thus determining a firm connection thereto. Although this boot is easier to apply and to remove and provides greater adaptability to different hoof shapes and/or sizes, it has a complex structure, which requires provision and assembly of a large number of members. In addition, the horse boot described in this document does not ensures uniform and enveloping contact between the walls of the upper and the hoof. In particular, where the strap acts upon fastening a gap arise between the hoof and the upper, wherein material from outside can accumulate; should this occur, the use of the horse boot becomes uncomfortable for the horse, and in the worst case, it can lead to injuries on the hoof.

SUMMARY OF THE INVENTION

The technical problem underlying the present invention is to provide an improved horse boot which allows to achieve a firm connection with the hoof, is easy and quick to fit and remove by a horseman, and has a structure which is simple and can be manufactured at a low cost.

This problem is solved according to the present invention by a horse boot assembly having the features set forth in the attached claim 1.

Preferred features of the horse boot assembly according to the invention are set forth in the dependent claims.

In particular, the invention refers to a horse boot assembly comprising:
  a boot body shaped to house a hoof of a horse;
  fastening means associated with the boot body for fastening the horse boot assembly onto the hoof, and
  an adapter, characterised in that said adapter is compressed against a rear part of the hoof upon fastening of said fastening means.

The adapter compressed against the hoof upon fastening of the fastening means associated with the boot body advantageously allows to obtain a firm connection at the rear part of the hoof. In addition, cooperation between the various parts upon fastening is such to ensure an enveloping contact, substantially without undesired gaps, both between the adapter and the rear part of the hoof, and, possibly, between the boot body and the adapter. Nevertheless, application and removal of the horse boot assembly still remain easy, in that, when the fastening means are loosened, the adapter frees the hoof, returning to a rest position.

The structure that allows these effects to be achieved is particularly simple and comprises a limited number of members, which can be obtained through conventional mass production processes, and, where required, can be assembled with each other easily either by the manufacturer or by the end user.

Moreover, each of the adapter and the boot body can be made according to the most suitable shape and using the most appropriate material depending on the respective function.

Preferably, the adapter comprises a base positioned on a portion of a sole of the boot body, and a vertical wall adapted to be interposed between a rear portion of the upper of the boot body and said rear part of the hoof.

According to a preferred embodiment of the invention, the hoof is provided with a horseshoe and the adapter comprises engagement means for engagement with the horseshoe. Thus, by means of the adapter it is advantageously possible to also use parts of the horseshoe as engagement areas between the horse boot assembly and hoof, thus enhancing the firmness and stability of the connection between the two.

Preferably, the engagement means comprise at least one rib extended horizontally along the vertical wall of the adapter, which rib is adapted to define an upper abutment for at least one portion of the horseshoe projecting at the rear with respect to the hoof. Such at least one projecting portion of the horseshoe is thus advantageously used as an undercut with which said at least one rib can cooperate in the fastened configuration of the horse boot assembly in such a way to substantially eliminate the possibility of detachment of the horse boot assembly.

More preferably, the engagement means comprise a plurality of ribs extending horizontally at different heights along said vertical wall of the adapter. This provides the adapter, and thus the horse boot assembly, with a greater versatility as far as engagement with hooves of different sizes and/or horseshoes of different thicknesses is concerned.

Regardless of the presence of the abovementioned ribs, when using open horseshoes the engagement means preferably comprise a raised area at the base of the adapter adapted to be interposed in abutment between the ends of the bars of the horseshoe. Advantageously, such raised area cooperates with the ends of the bars of the horseshoe so as to substantially prevent rotations of the horse boot assembly with respect to the hoof.

Preferably, the raised area is formed by interposing a shim between the sole of the boot body and the base of the adapter. Advantageously, on the one hand, using a separate shim allows to form the raised part at the base of the adapter without modifying the adapter or the boot body themselves, while, on the other hand, it allows to obtain an optimal engagement with the horseshoe, in that the size of the shim can be selected each time so as to be precisely adapted to the shape and size of a particular horseshoe. In particularly, with this arrangement the horse boot assembly according to the present invention can be immediately and easily used even in case of shoeing with closed or O-shaped horseshoes, simply by omitting the shim.

Preferably, the shim comprises at least one plate having a width substantially equal to the distance between said ends of the bars of the horseshoe.

Preferably, the shim is made of a material having a higher stiffness with respect to the material of the adapter. Therefore, advantageously, the raised area is formed in dynamic conditions further to the natural deformation of the base of the adapter under the weight of the horse.

Preferably, the shim is made of an elastomeric material having Shore A hardness comprised between about 70 and about 90.

In an alternative embodiment of the invention, in place of the abovementioned raised area, the engagement means preferably comprise at least two projections extended vertically from the base of the adapter and positioned so as to define a lateral abutment at inner end sides of the bars of the horseshoe.

More preferably, the engagement means comprise a plurality of projections extending vertically from the base of the adapter, at least two projections of such plurality of projections being adapted to define a lateral abutment at inner sides of said ends of the bars of the horseshoe. This provides the horse boot assembly with a greater versatility and adaptability for use with horseshoes of different shape or sizes. In particular, one or more projections can be eliminated before use to allow proper engagement with horseshoes having different span.

Preferably, the vertical wall of the adapter comprises a cut extending vertically from the upper edge thereof. This, on the one hand, provides for a certain degree of adaptability with respect to hooves of different shape and/or size, while, on the other hand, advantageously facilitates an optimal positioning of the adapter against the rear part of the hoof upon fastening the fastening means, preventing in particular formation of folds of material further to the compression.

Preferably, the vertical wall of the adapter comprises at least one eyelet for the passage of said fastening means. By means of this at least one eyelet the fastening means can be associated directly also with the adapter, as well as with the boot body, and thus they can ensure an optimal accommodation of the adapter against the rear part of the hoof upon fastening. Moreover, when the horse boot assembly is not worn, the adapter and the boot body are mutually connected by means of the fastening means and thus an inadvertent loss of the adapter is not possible.

Preferably, the adapter is made in one piece. Therefore, it does not require complicated assembly operations and it can be readily associated with the boot body.

Preferably, the adapter is made of a material having a lower stiffness with respect to the material of the boot body. Thus, advantageously, the adapter can provide for an optimal and non invasive contact with the rear part of the hoof, with proper adaptation to different hoof shapes.

In a preferred embodiment of the invention, the adapter is made as an element distinct from the boot body.

In alternative preferred embodiments, the adapter can even be made integrally with the boot body. When elastomeric materials are used, this can be attained through overmoulding or co-injection processes known to the those skilled in the art.

Preferably, the adapter is made of an elastomeric material having a Shore A hardness comprised between about 40 and about 70. These values provides the adapter with optimal flexibility and softness for obtaining the aforementioned non invasive contact with the upper part of the hoof. In addition, the use of elastomeric material allows mass production at low costs through conventional moulding or injection production processes.

The boot body comprises a front portion of upper intended to come into contact with the wall of the hoof and such front portion preferably comprises, at the side facing the inside of the boot body, at least one grooved area with parallel grooves substantially perpendicular to the edge of the upper. Such grooves advantageously ensure a suitable aeration of the nail and of the front part the hoof, favouring as much as possible the natural perspiration of these parts and thus preventing the onset of hoof pathologies related to lack of perspiration.

Preferably, said front portion of upper comprises a first cut extending vertically from the upper edge thereof.

Furthermore, the boot body comprises a rear portion of upper and such rear portion comprises preferably a second cut extending vertically from the upper edge thereof.

Such first and second cuts, as well as the cut in the vertical wall of the adapter, advantageously provide for a certain degree of adaptability with respect to hooves of different shape and/or dimensions. In addition, they allow temporarily a greater opening of the boot body, thus facilitating its application onto the hoof.

To further improve adaptability, the second cut preferably extends partially into the sole of the boot body.

Preferably, in this case, the boot body comprises a diaphragm arranged at a portion of said second cut extended into the sole. This advantageously avoids the passage of soil, sand or other materials into the boot body through such cut.

Preferably, the boot body is made in one piece. Thus, it does not require complicated assembly operations and it can be readily associated with the adapter.

Preferably, the boot body is made of an elastomeric material having a Shore A hardness comprised between about 70 and about 90. These values provides the boot body with a stiffness and resistance to impacts and abrasion suitable for its protective function and, at the same time, ensure a low friction between sole and most common hard surfaces, such as dirt patch, asphalt, concrete. In addition, as already mentioned with reference to the adapter, the use of an elastomeric material allows mass production at low costs through conventional moulding or injection production processes.

Preferably, the fastening means form a multiple pulley traction system. In this manner, due to the force multiplication effect, it is advantageously possible to achieve a high fastening force upon application of a relatively low pulling force by the user.

According to a preferred embodiment of the invention, the fastening means comprise a first ribbon-like element folded on itself having two free ends connectible at a fastening group defining a first pulley of the multiple pulley traction system, and a second ribbon-like element folded on itself and connected to the first ribbon-like element at an intermediate section and at free ends thereof through rings defining a second pulley of said multiple pulley traction system. This configuration allows to obtain an optimal accommodation of the fastening means with respect to the boot body and, consequently, a circumferentially more uniform distribution of the fastening force.

In an alternative embodiment; the fastening means comprise one ribbon-like element folded on itself, said ribbon-like element having two free ends connectible at a fastening group defining a pulley of the multiple pulley traction system, and being closed ring-wise around the boot body by means of a ring defining a second pulley of the multiple pulley traction system.

Preferably, the boot body comprises openings for the passage of said fastening means. Such openings allow to slidably associate the fastening means to the boot body for an effective cooperation of such means with the boot body upon fastening.

In particular, the boot body preferably comprises two pairs of first openings formed at the front portion of the upper and two pairs of second opening formed at the rear portion of the upper.

Preferably, the first openings and the second openings are arranged symmetrically with respect to a middle longitudinal axis of said boot body.

Preferably, the fastening means are associated with said boot body so as to pass at least partially internally with respect to the boot body and externally with respect to the adapter. Through this arrangement, advantageously the fastening means act at least partially independently on the adapter and on the boot body, allowing a better accommodation of the elements between them. Thus, the adapter is compressed both directly by the fastening means and by the thrust of the boot body.

BRIEF DESCRIPTION OF THE DRAWINGS

Further characteristics and advantages of the present invention shall become clearer from the following description of some preferred embodiments thereof, made hereafter, for indicating and not limiting purposes, with reference to the attached drawings. In such drawings:

FIG. 6b is a schematic enlarged view of a detail of FIG. 6a;

DETAILED DESCRIPTION OF SOME PREFERRED EMBODIMENTS OF THE INVENTION

Figure 1:
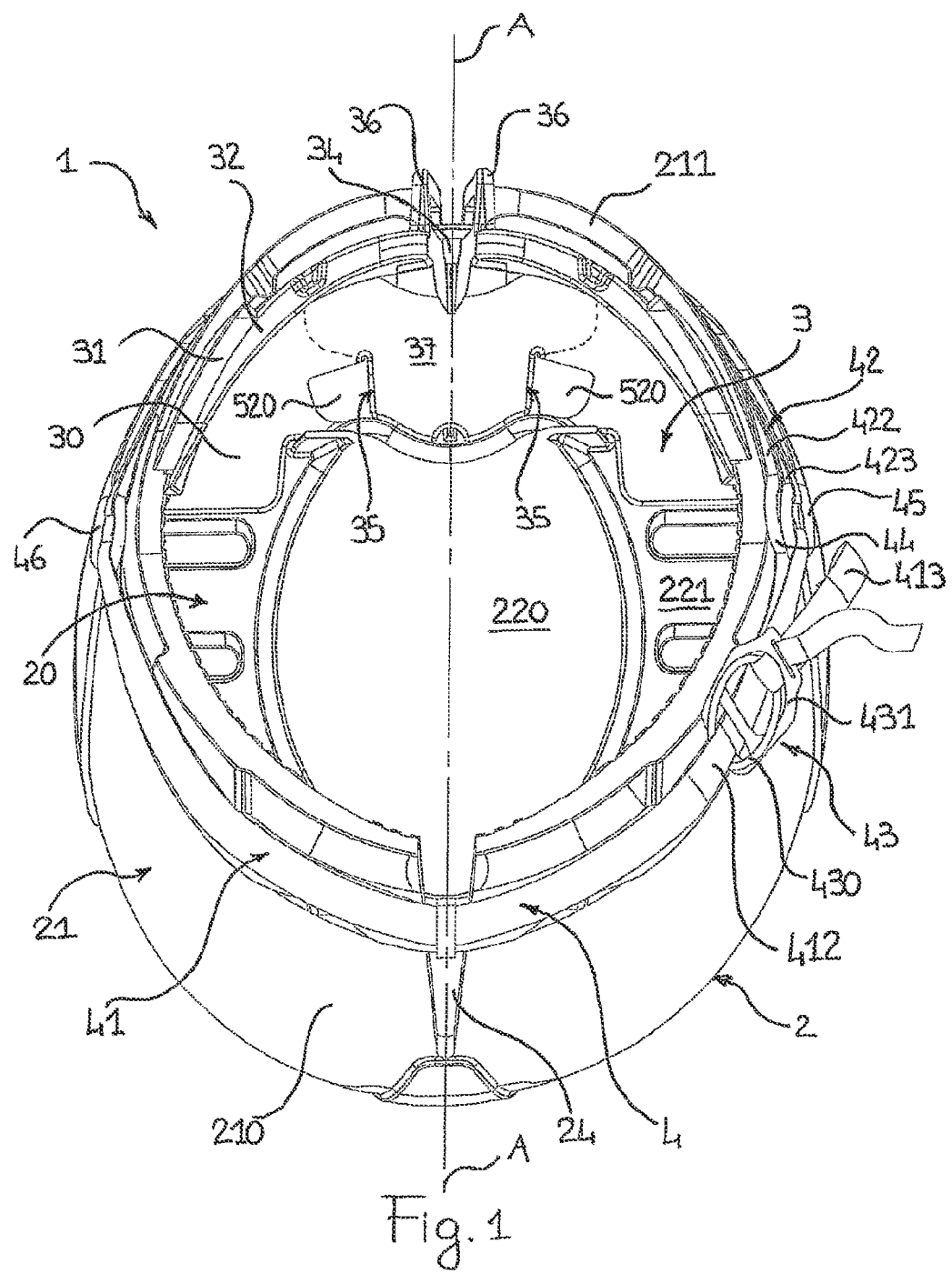
FIG. 1 is a schematic top view of a horse boot assembly according to a preferred embodiment of the invention.
Figure 2:
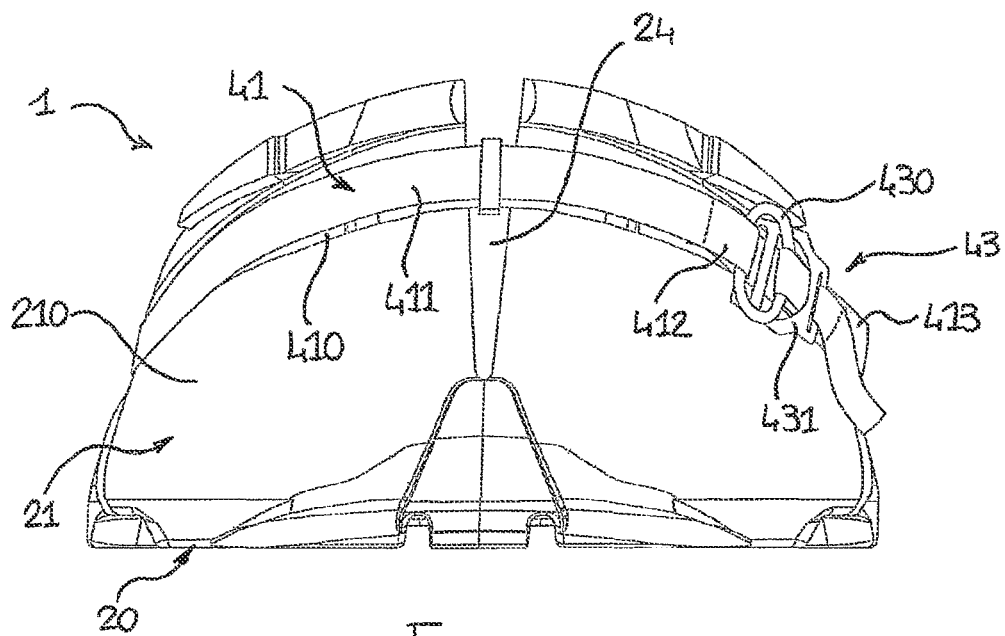
FIG. 2 is a schematic front view of the horse boot assembly of FIG. 1.

In FIG. 1, a preferred embodiment of the horse boot assembly according to the invention is globally indicated by reference numeral 1.

The assembly 1 essentially comprises a boot body 2, shaped to accommodate a hoof 10 of a horse (see FIGS. 7 and 8), an adapter 3 arranged inside the boot body 2, and fastening means 4 associated to the boot body 2 for fastening the assembly 1 onto the hoof 10.

The hoof 10 is provided with a horseshoe 11 which, in the embodiment of the invention shown herein, is of the open or U-shaped type, but it could also be of the closed or O-shaped type.

Figure 9:
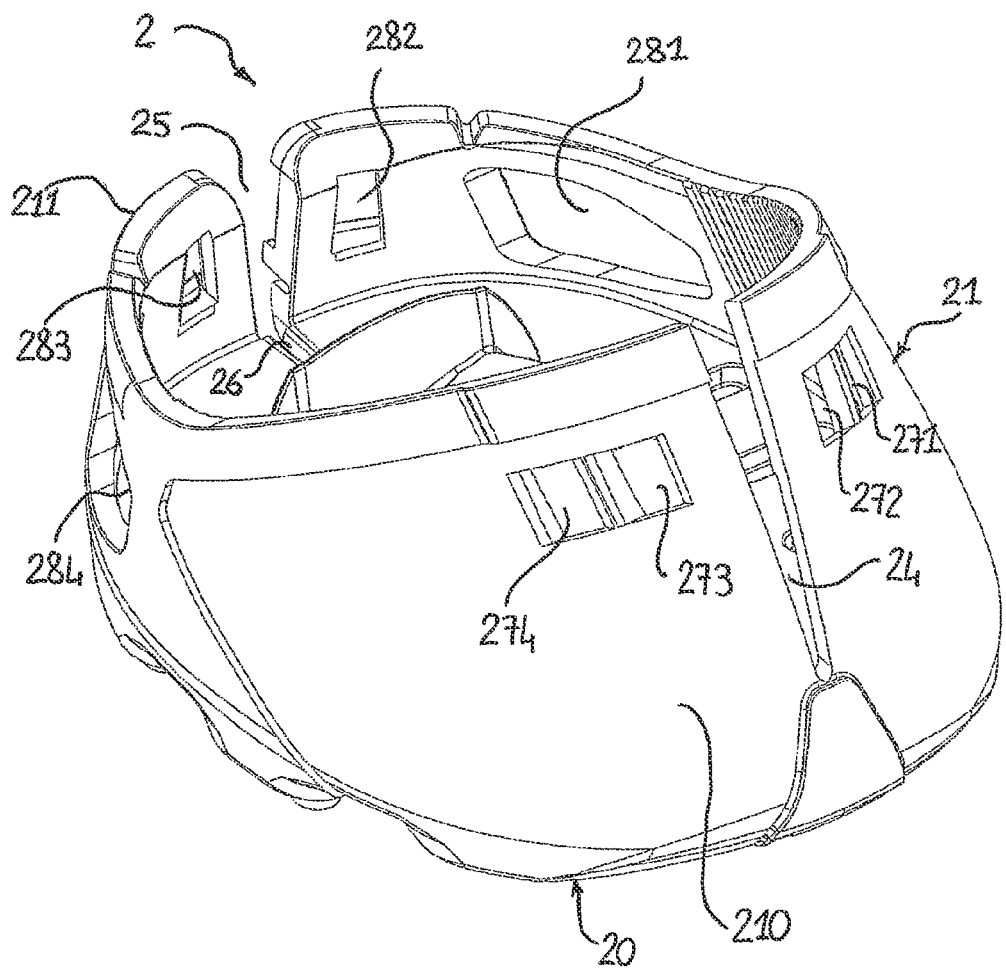
FIG. 9 is a schematic front perspective view of the boot body of the boot assembly of FIG. 1.
Figure 10:
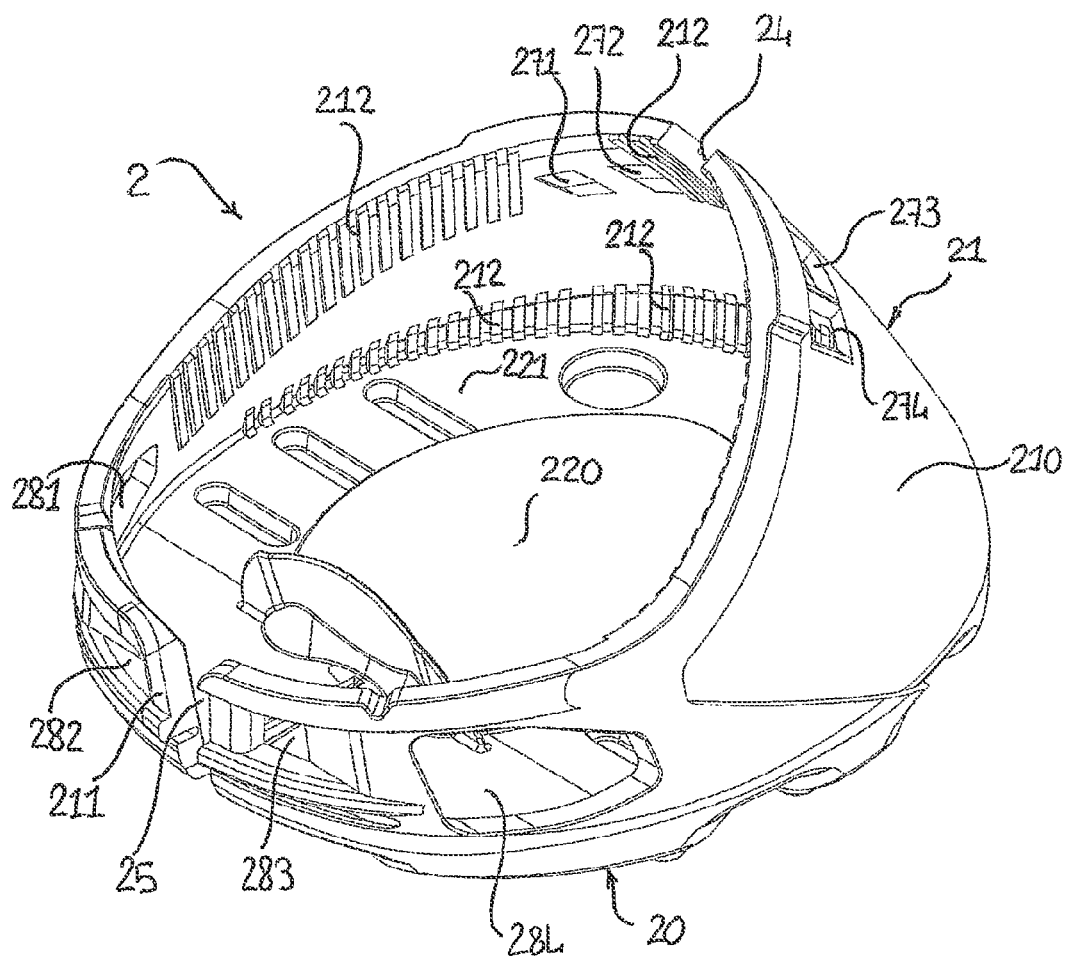
FIG. 10 is a schematic rear perspective view of the boot body of the boot assembly of FIG. 1.
Figure 11:
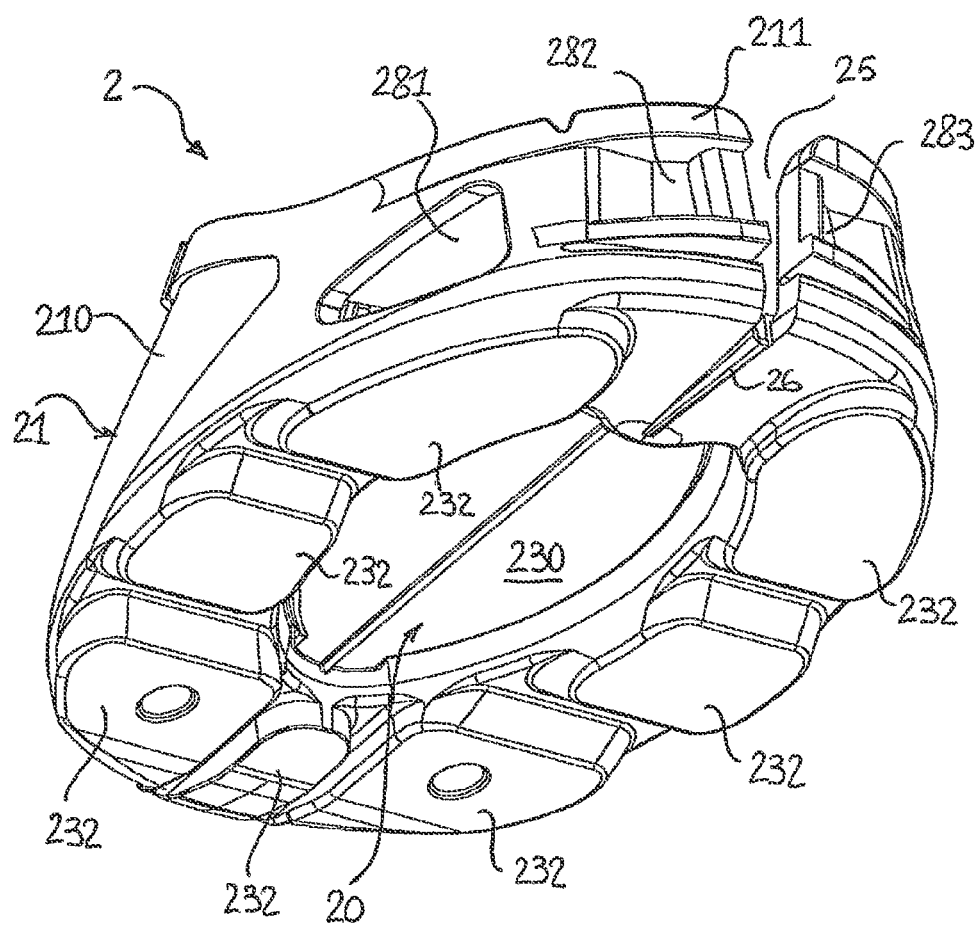
FIG. 11 is a schematic bottom perspective view of the boot body of the boot assembly of FIG. 1.

As shown in particular in FIGS. 9-11, the boot body 2 essentially consists of a sole 20 and an upper 21 made in one piece of an elastomeric material, through conventional injection moulding processes. A preferred elastomeric material for the boot body 2 is thermoplastic polyurethane having Shore A hardness comprised between about 70 and about 90. The optimal hardness values within such range shall be selected depending on the expected use conditions, in particular depending on the season and ambient temperature.

The sole 20 has an internal side and external side. The internal side (see FIGS. 1 and 10) comprises a raised central area 220, intended to come into contact with the central part of the hoof 10, not covered by the horseshoe 11, and a peripheral area 221, intended to accommodate the horseshoe 11. The external side (see FIG. 11) comprises a hollow central area 230, negative with respect to the raised central area 220 on the internal side, and a peripheral area preferably provided with embossments 232. The shape and arrangement of the embossments 232 can be advantageously selected according to the type of soil and and/or discipline, in order to obtain the best relationship between the assembly 1 and the soil.

Figure 11A:
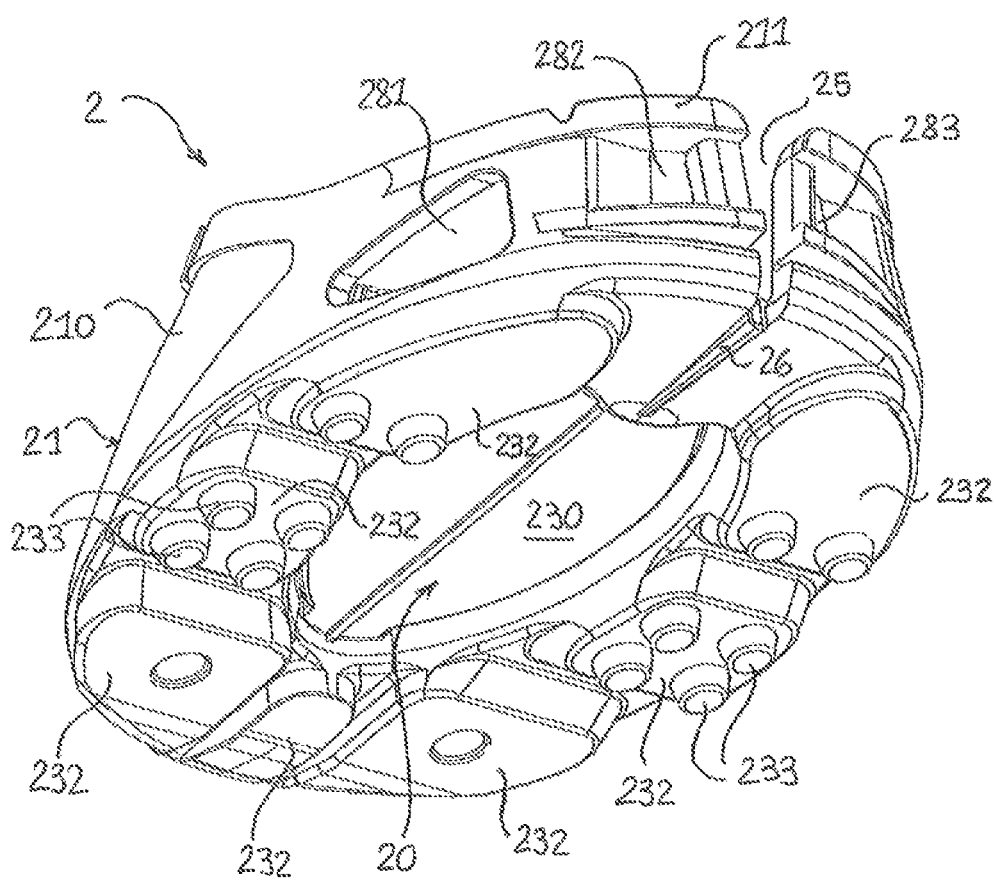
FIG. 11a is a view corresponding to that of FIG. 11, referred to an alternative embodiment of the invention.

As shown in FIG. 11*a*, in addition to the embossments 232, studs 233 can be provided integrally made with the sole 20 or, in case of metal studs, associated to or overmoulded with the sole 20. Obviously, the number and shape of the studs 233 shown in FIG. 11*a* are solely for illustrative purpose and they can vary depending on the requirements.

With the assembly 1 it is also possible to use spikes of various length pressure-fitted or screwed into the sole 20 or else screwed normally onto the horseshoe 11. In the latter case, through holes need to be drilled into the sole 20 in advance at the position intended for the spikes.

The upper 21 extends peripherally from the sole 20 and comprises a front portion 210, slanted with respect to the sole 20 in such a manner to form a suitable undercut for the front wall of the hoof 10, and a rear portion 211, substantially vertical. The height of the upper 21 is preferably such not to reach, both at the front and, above all, at the rear, sensitive parts of the hoof 10.

The front portion 210 comprises, at the side facing the inside of the boot body 2, grooved areas 212 with parallel grooves substantially perpendicular to the edge of the upper 21. Preferably, as shown in FIG. 10, the grooved areas 212 are formed both at the upper edge and at the base of the upper 21. However, according to alternative embodiments, not illustrated, it is possible to provide grooved areas 212 which extend along the entire height of the upper 21.

The boot body 2 comprises a first V-shaped cut 24 at the front portion 210 of the upper 21, extending vertically form the upper edge thereof, and a second cut 25 at the rear portion 211 of the upper 21, also extending vertically from the upper edge of the same. The second cut 25 extends also partially into the sole 20 and, at the portion in the sole 20, it is closed towards the exterior by a diaphragm 26 (see FIG. 11). The diaphragm 26 is preferably V-folded in the transverse direction, so that possible opening of the second cut 25 resulting from the adaptation of the boot body 2 to different shapes and/or dimensions of the hoof 10 is not hindered. Both cuts 24 and 25 are preferably formed along a middle longitudinal axis of the boot body 2, whose trace coincides with the line A-A of FIG. 1.

The boot body 2 further comprises openings in the upper 21 for the passage of the fastening means 4, as better described subsequently. In particular, in the preferred embodiment illustrated herein there are two pairs of openings 271, 272 and 273, 274 in the front portion 210 of the upper 21 and two pairs of openings 281, 282 and 283, 284 in the rear portion 211 of the upper 21. Such pairs of openings are preferably arranged symmetrically with respect to the middle longitudinal axis of the boot body 2.

Figure 12:
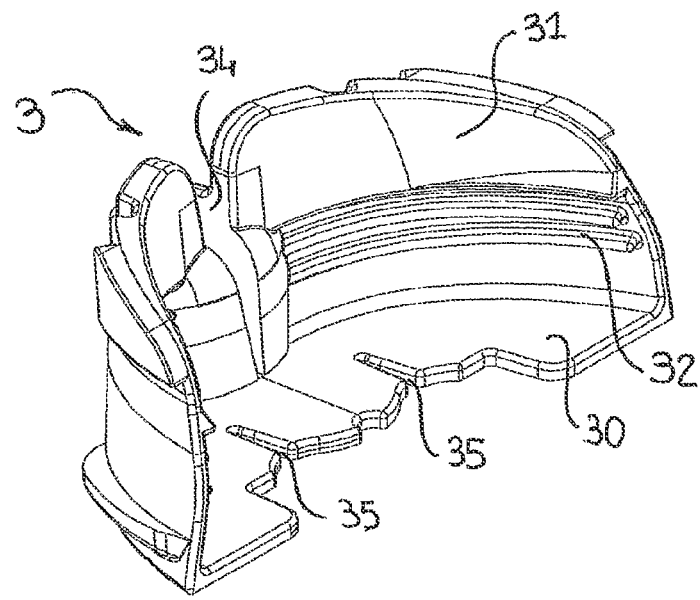
FIG. 12 is a schematic front perspective view of the adapter of the boot assembly of FIG. 1.
Figure 13:
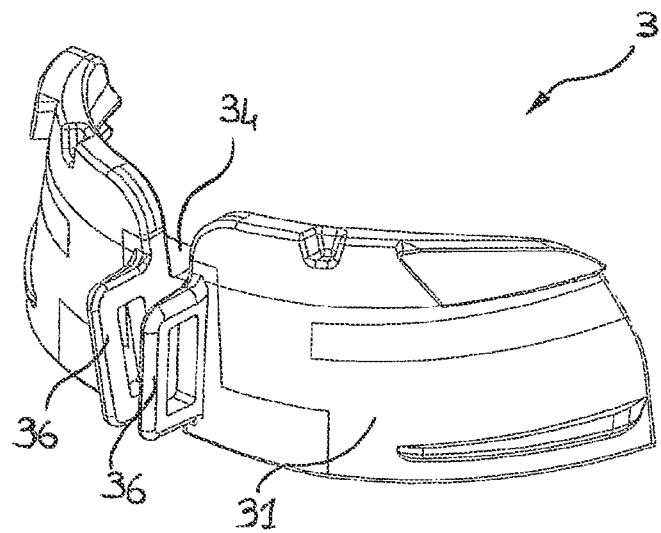
FIG. 13 is a schematic rear perspective view of the adapter of the boot assembly of FIG. 1.

As shown in detail in FIGS. 12 and 13, the adapter 3 comprises a substantially flat base 30, intended to lie on a portion of the sole 20 of the boot body 2, and a curved vertical wall 31, intended to be interposed between the rear portion 211 of the upper 21 of the boot body 2 and the rear part of the hoof 10.

Also the adapter 3 is formed in one piece in an elastomeric material, through conventional injection moulding processes. Preferred materials for the adapter 3 are modified thermoplastic polyurethanes having a Shore A hardness comprised between about 40 and about 70. The optimal values of hardness within such range shall be selected depending on the expected conditions of use, in particular depending on the season and ambient temperature.

Figure 6:
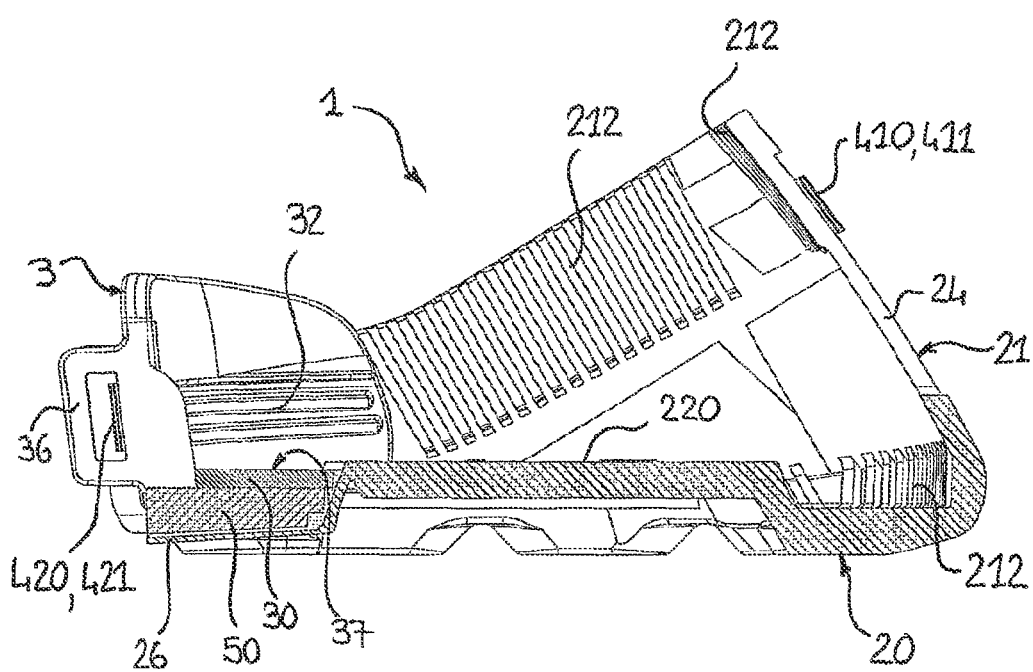
FIG. 6 is a schematic side sectional view along line A-A of FIG. 1 of the horse boot assembly of FIG. 1.
Figure 6A:
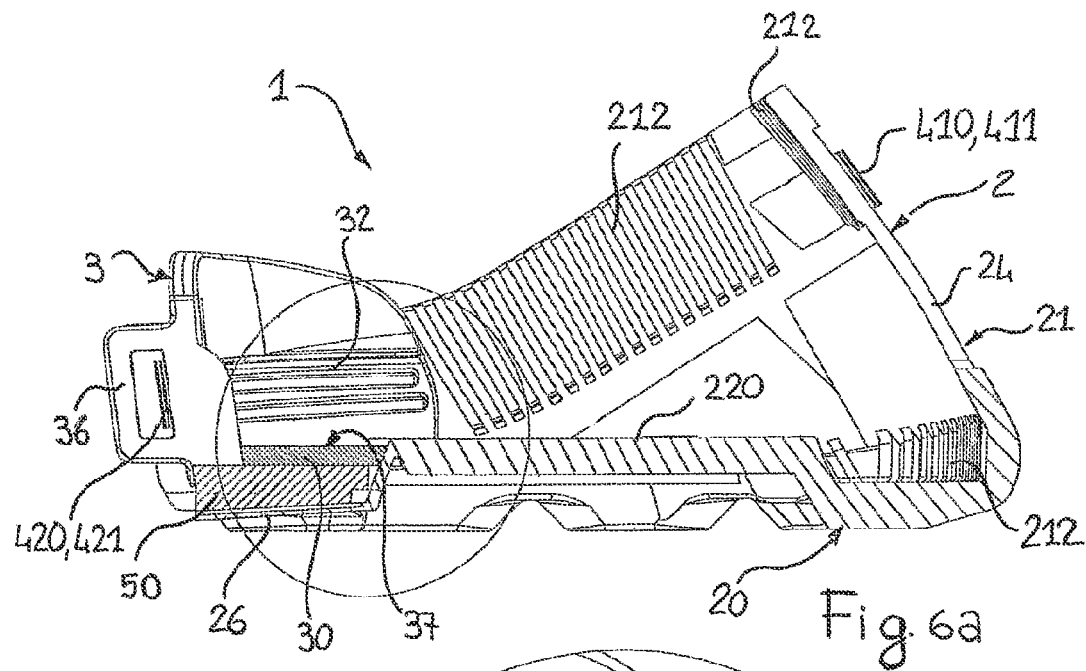
FIG. 6a is a view corresponding to that of FIG. 6, referred to an alternative embodiment of the invention.
Figure 6B:
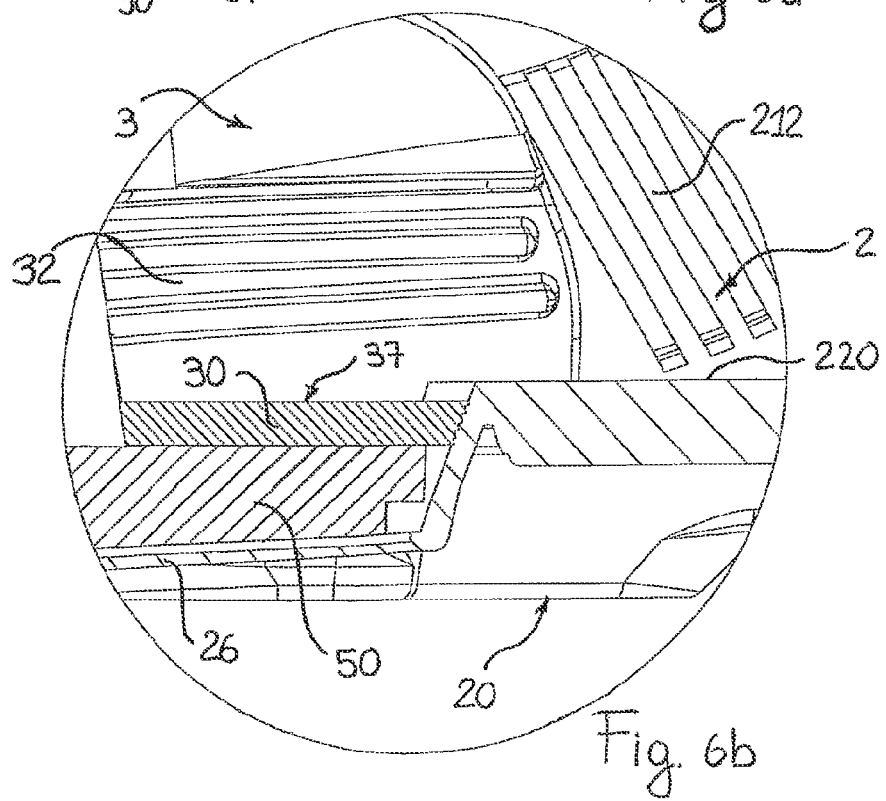

The adapter 3 can be made as a separate element with respect to the boot body 2 (see in particular FIGS. 1, 6, 12, 12*a* e 13) or partially or entirely integrally with the boot body 1 (see FIGS. 6*a* and 6*b*) through overmoulding or co-injection processes known to those skilled in the art.

The adapter 3 comprises a V-shaped cut 34 at the vertical wall 31, extending vertically from the upper edge thereof. The cut 34 is preferably formed along a middle longitudinal axis of the adapter 3, whose trace coincides with the line A-A of FIG. 1.

Figure 3:
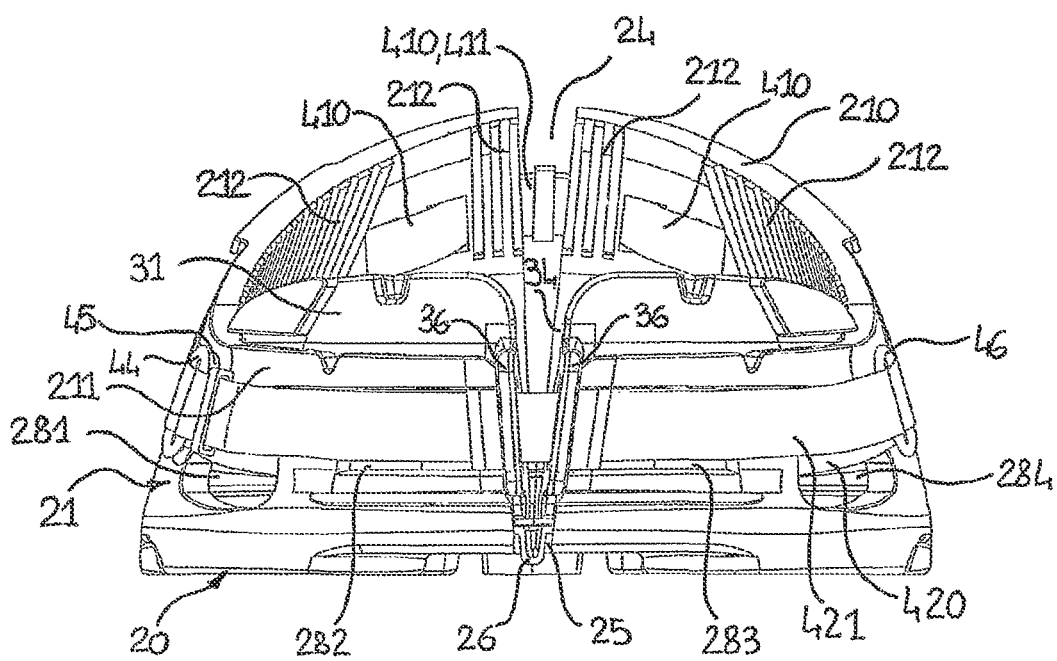
FIG. 3 is a schematic rear view of the horse boot assembly of FIG. 1.
Figure 4:
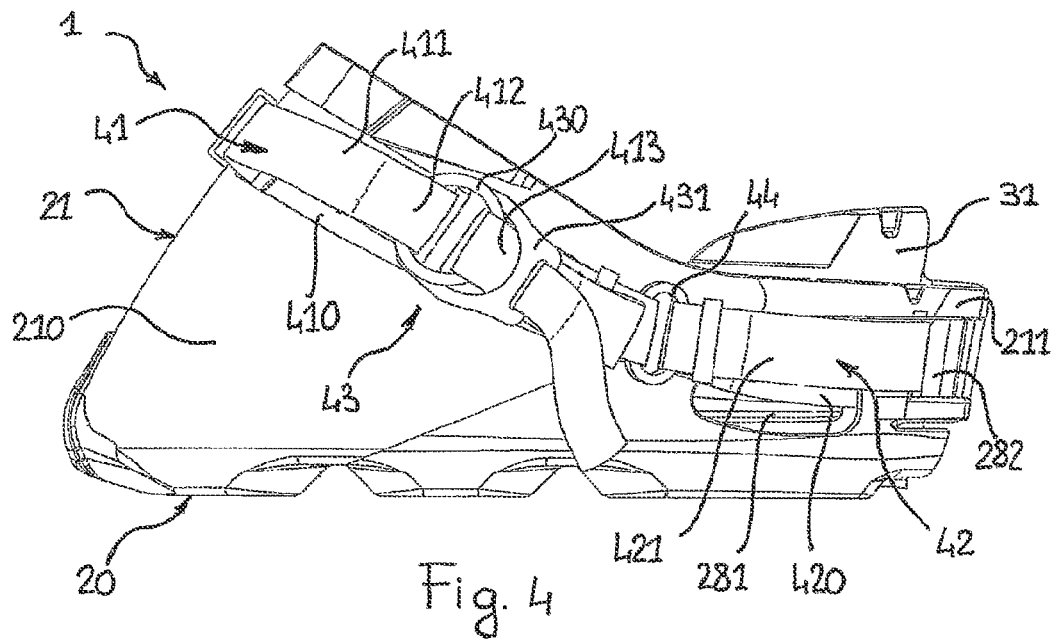
FIG. 4 is a schematic right side view of the horse boot assembly of FIG. 1.
Figure 5:
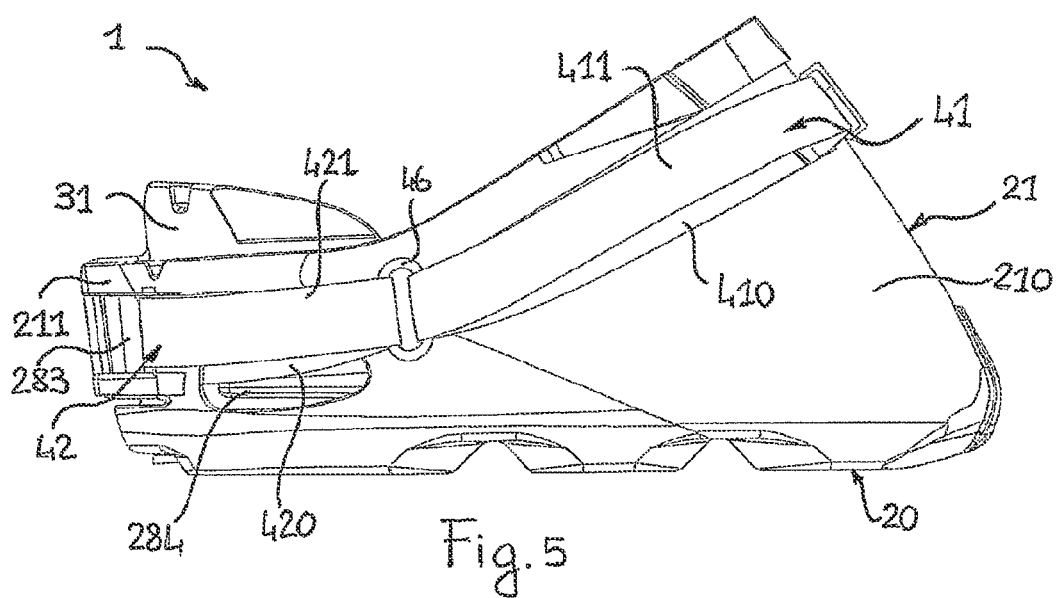
FIG. 5 is a schematic left side view of the horse boot assembly of FIG. 1.

The adapter 3 further comprises two eyelets 36 for the passage of the fastening means 4, formed on the external side of the vertical wall 31 and substantially projecting perpendicularly thereto. The eyelets 36 are made at the edges of the cut 34 so as that, in the assembled configuration of the assembly 1, they are positioned within the cut 25 in the rear portion 211 of the boot body 2 (see FIGS. 1 and 3).

The adapter 3 is provided with engagement means with the horseshoe 11.

Figure 8:
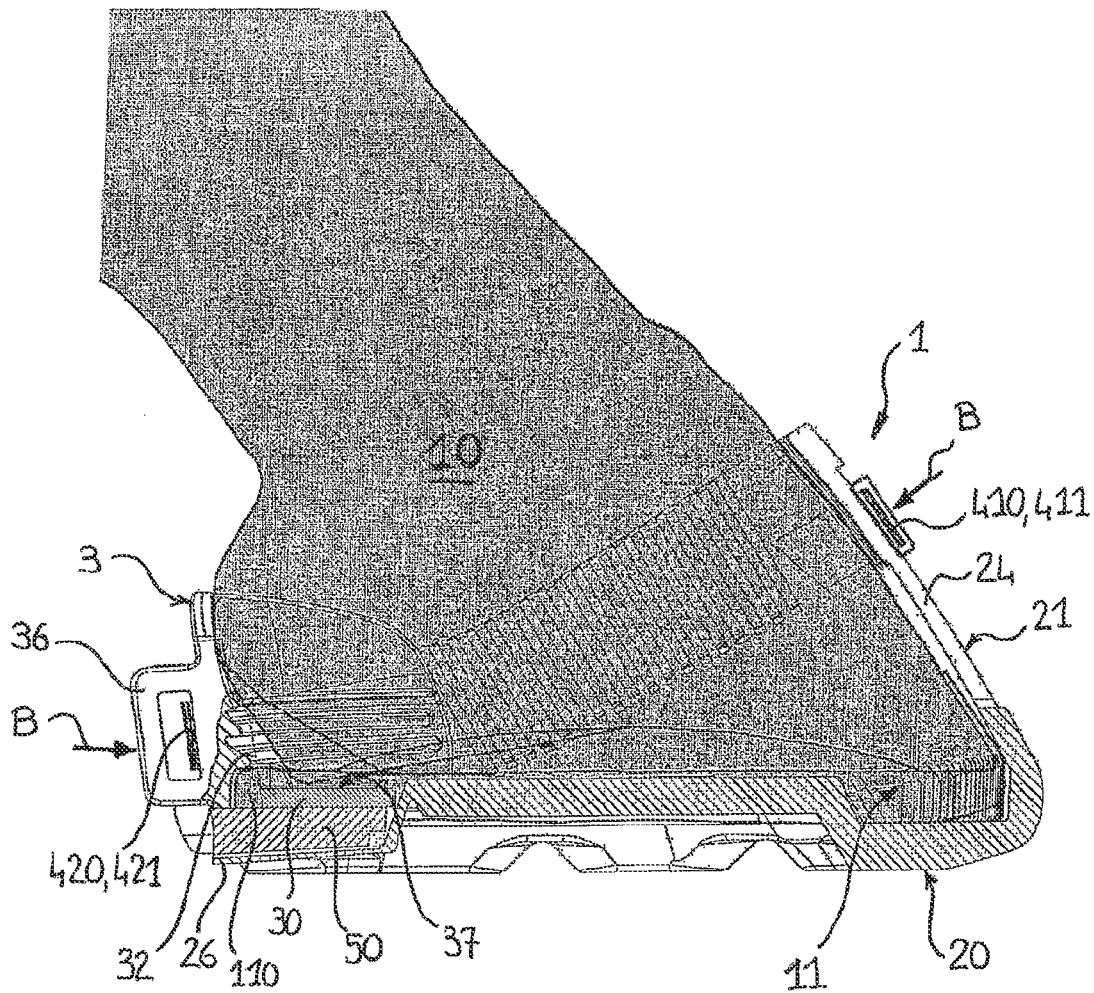
FIG. 8 is a view corresponding to that of FIG. 7, which shows the assembly in a configuration applied onto a shoed hoof of a horse and fastened thereto.

A first group of such engagement means comprises a plurality of ribs 32 extending horizontally at different heights along the vertical wall 31, at least one of which is at a height suitable to define an upper abutment for the ends 110 of the bars of the horseshoe 11 (or for the rear peripheral edge of the same, in case of a closed or O-shaped horseshoe) when the adapter 3 is compressed against the rear part of the hoof 10 further to the fastening of the fastening means 4 (see FIG. 8).

A second group of engagement means comprises a raised area 37 in the base 30 of the adapter 3 adapted to be interposed in abutment between the ends 110 of the bars of the horseshoe 11 (see FIGS. 1, 6-8).

In the preferred embodiment illustrated herein, the raised area 37 is formed by interposing a shim 5 between the sole 20 of the boot body 2 and the base 30 of the adapter. Such shim 5 is defined by a plate 50 of suitable dimensions and made of a material having a higher stiffness with respect to the material the adapter is made of, thus the raised area 37 is formed further to the natural deformation of the base of the adapter under the pressure of the horse weight when the assembly 1 is worn onto the hoof 10. A preferred material for making the plate 50 is thermoplastic polyurethane having Shore A hardness comprised between about 70 and about 90.

Figure 14:
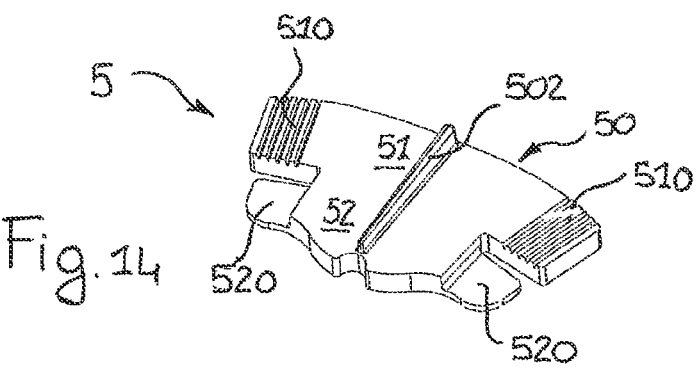
FIG. 14 is a schematic bottom perspective view of a shim plate for the boot assembly of FIG. 1.
Figure 15:
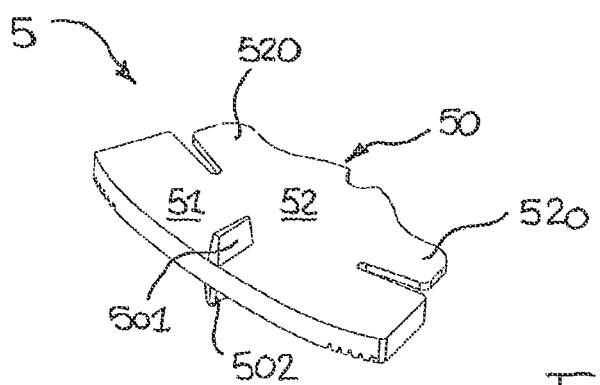
FIG. 15 is a schematic top perspective view of a shim plate for the boot assembly of FIG. 14.

The plate 50 (see FIGS. 14 and 15) preferably is substantially T-shaped, with a horizontal portion 51 and vertical portion 52. The width of the horizontal portion 51 is substantially equal to the distance between the ends 110 of the bars of the horseshoe 11, so that interposition with abutment of the raised area 37 in the base 30 of the adapter 3 between the bars is obtained.

The ends of the horizontal portion 51 can be possibly shortened by the user depending on the needs. To make such operation easier, some cuts 510 are preferably preformed at such ends. Of course, when using the assembly 1 on hooves with closed or O-shaped horseshoes, the plate can be easily omitted, so that the raised area 37 is not formed.

Preferably, at opposite sides of the vertical portion 52 flaps 520 with reduced thickness are provided, which are adapted to be engaged with cuts 35 formed in the base 30 of the adapter 3 (see FIG. 1). Furthermore, preferably, at the upper and lower faces of the plate 50 ribs 501 and 502 respectively are provided, which are adapted to engage respectively with the base of cut 34 in the vertical wall 31 of the adapter 3, and with the portion extended into the sole 20 of cut 25 in the upper 21 of the boot body. The ribs 501 and 502 thus advantageously allow proper centring of the plate 50 with respect to the boot body 2 and the adapter 3 while assembling the set 1, as well as its preservation during use.

In case the adapter 3 is made as a separate element with respect to the boot body 1, the application or removal of the plate 50 is readily done by disassembling the assembly 1. In case the adapter 3 is formed integrally with the boot body 2, for application or removal of the plate 50 it is possible, for example, to provide for an opening between the sole 20 of the boot body 2 and the base 30 of the adapter 3 adapted to receive in a drawer-like manner the plate 50 and is accessible from outside the boot body 2.

Figure 12A:
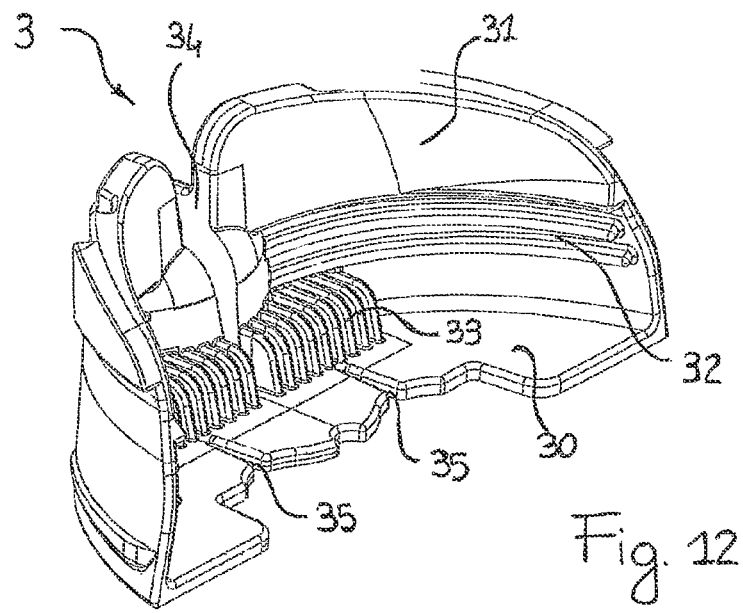
FIG. 12a is a view corresponding to that of FIG. 12 referred to an alternative embodiment of the invention.

In an alternative embodiment of the invention, the above-mentioned raised area 37 in the base 30 of the adapter 3 can be replaced by two or more projections 33 extending vertically from the base 30. FIG. 12a shows an example of such alternative embodiment, in which the raised area 37 has been replaced by a plurality of projections 30 having the form of parallel reeds of suitable thickness. The zone of the base 30 comprising the projections 33 extends transversely so that, when the assembly 1 is worn on the hoof 10, the projections 33 are positioned between the ends 110 of the bars of the horseshoe and two projections 33 transversely more external are in lateral abutment against the internal sides of the ends 110. In case of use with horseshoes particularly closed in the rear part, it is possible to remove some of the projections 33 originally formed, so that the remaining ones are properly positioned between the ends 110 of the bars of the horseshoe. The projections 33 can also be completely removed in case of use with closed or O-shaped horseshoes.

As shown in particular in FIGS. 1-5, the fastening means 4 comprise two ribbon-like elements in form of straps 41, 42, which are peripherally associated to the boot body 2 at the upper edge of the upper 21 and are connected with each other in a manner to form a multiple pulley traction system, described below.

The strap 41, associated with the front portion 210 of the upper 21, is folded on itself in a manner to form two branches 410, 411. The first branch 410 is slidably associated with the upper 21 at the openings 271-274. In detail, it passes from the outside of the upper 21 to the inside of the same at the opening 271; it returns to the outside at the opening 272; it passes to the inside again at the opening 273 and finally it returns to the outside at the opening 274. The second branch 411 always passes outside the upper 21.

On the second branch 411 there are free ends 412, 413 of the strap 41, which can cooperate for the fastening by means of a fastening group 43. The fastening group 43 essentially comprises a ring 430 fixed at the free end 412, around which the free end 413 is returned. Thus, upon fastening, the ring 430 acts as a first pulley of the aforementioned multiple pulley traction system. The fastening group 43 further comprises a friction element 431, also fixed to the free end 412, which, in fastened conditions, prevents the free end 413 from sliding with respect to the ring 430.

The strap 42, associated with the rear portion 211 of the upper 21 is also folded on itself so as to form two branches 420, 421. Both such branches, though following different paths, are slidably associated with the upper 21 at the openings 281-284. In detail, the first branch 420 passes from the outside of the upper 21 to the inside of the same at the opening 281; inside the upper 21 it passes outside the adapter 3 fitting into the eyelets 36 of the latter; finally it returns to the outside the upper 21 at opening 284. The second branch 421 passes from the outside of the upper 21 to the inside of the same at the opening 282; inside the upper 21 it passes outside the adapter 3 fitting with the first branch 420 into the eyelets 36; finally it returns to the outside of the upper 21 at the opening 283.

Free ends 422, 423 of the strap 43 are provided with respective rings 44, 45, through which they are slidably connected with an end of the strap 42 folded on itself. An additional ring 46 acts as a sliding connection between the remaining ends of the straps 41 and 42 folded on themselves, globally closing them ring-wise around the upper 21. From the point of view of the first strap 41, rings 44, 45 on the one hand and ring 46 on the other hand act globally as a second pulley of the above-mentioned multiple pulley traction system.

A man skilled in the art can find other embodiments for the fastening means 4, in any case suitable for defining a multiple pulley traction system acting on the periphery of the upper 21 as in the preferred embodiment described above.

For example, in an alternative embodiment not illustrated, it is possible to use only one strap, for example strap 41. This strap is still folded on itself and it has free ends 410, 411 that can cooperate for fastening by means of the fastening group 43, at which a first pulley of the multiple pulley traction system is defined. The strap 41 folded on itself is in turn closed ring-wise and the ends of the folded strap are connected with each other through a ring, defining a second pulley of the pulley traction system.

Figure 7:
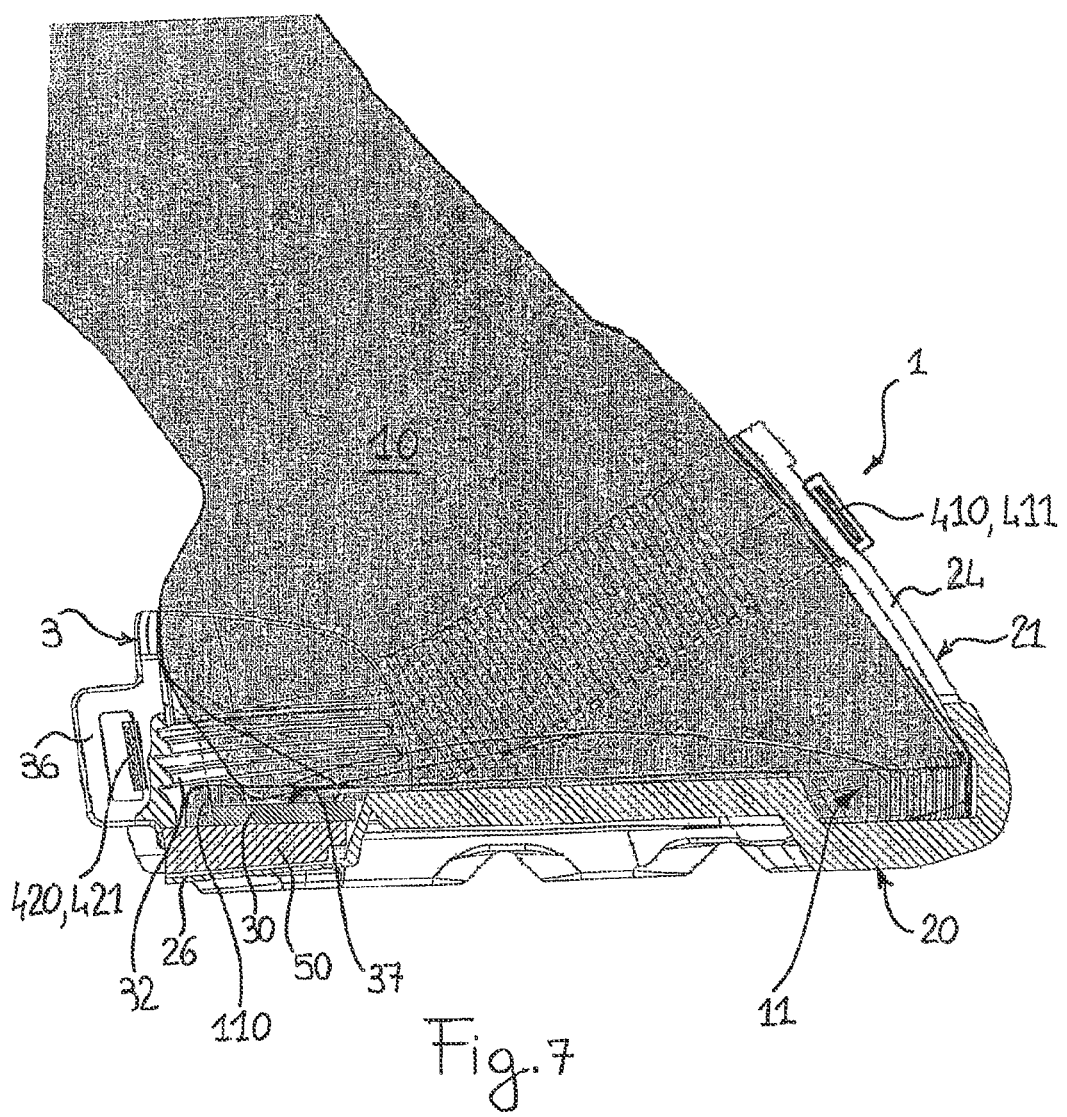
FIG. 7 is a schematic side sectional view along line A-A of FIG. 1 and with parts partially removed of the horse boot assembly of FIG. 1, which shows the assembly in a configuration applied onto a shoed hoof of a horse but not fastened thereto.

The functioning of the horse boot assembly 1 described above is illustrated in FIGS. 7 and 8, which show the relation between such assembly and the shoed hoof 10. The application of the assembly 1 onto the hoof 10 occurs with the fastening means 4 in a non-fastened condition, so as to allow maximum access and, if necessary, opening of the boot body 2 at the cuts 24 and 34. FIG. 7 shows the relation between the hoof 10 and the assembly 1 worn, but not fastened. It can be observed that the front wall of the hoof 10 abuts with the front portion 210 of the upper 21, while the rear part is freely accommodated by the adapter 3. The horseshoe 11 is positioned at the peripheral zone 221 of the sole 20 and the raised area 37 (or the projections 33 in the alternative embodiment of the adapter 3 shown in FIG. 12a) of the adapter 3 is inserted in abutment between the ends 110 of the bars of the horseshoe 11.

Upon fastening of the fastening means 4, the thrust peripherally generated by such means, schematically indicated by the arrows B in FIG. 8, causes in particular the compression of the adapter 3 against the rear part of the hoof 10. Further to such compression, one of the ribs 32 of the adapter 3 engages with the ends 110 of the bars of the horseshoe 11, thus forming an upper abutment for them, and the entire vertical wall 31 of the adapter 3 adheres and conforms to the rear zone of the hoof 10. In this condition, the assembly 1 is substantially integral with the hoof 10 both with respect to rotations and to detachment.

Obviously, those skilled in the art may introduce variants and modifications in the horse boot assembly described above, in order to satisfy specific and contingent requirements, which variants and modifications fall anyhow within the scope of protection as is defined by the appended claims.

The invention claimed is:
1. A horse boot assembly comprising:
a boot body shaped to accommodate a hoof of a horse provided with a horseshoe, the boot body having a sole with a first raised section in a central area of the sole configured to contact a portion of the hoof not covered by the horseshoe, and a second section disposed to the front and sides of the first raised section and configured to accommodate a front and sides of the horseshoe;
fastening means associated with said boot body for fastening the boot assembly onto said hoof; and an adapter distinct from and inserted in said boot body, the adapter comprising a base lying on a portion of the sole of the boot body, and a vertical wall adapted to be interposed between a rear portion of an upper of the boot body and a rear part of the hoof, wherein said adapter further comprises engagement means for engagement with said horseshoe, and engagement means are configured for engagement with an open horseshoe and said engagement means comprise a raised area in said base of the adapter, the raised area being disposed rearward of said first raised section and configured for interposition in abutment between ends of bars of the open horseshoe, and wherein said adapter is compressed against said rear part of said hoof upon fastening of said fastening means.

2. The assembly according to claim 1, wherein said engagement means comprise at least one rib extending horizontally along said vertical wall of the adapter, said at least one rib being adapted to define an upper abutment for at least one portion of the horseshoe projecting at the rear with respect to the hoof.

3. The assembly according to claim 2, wherein said engagement means comprise a plurality of ribs extending horizontally at different heights along said vertical wall of the adapter.

4. The assembly according to claim 1, wherein said raised area is formed by interposing a shim between said sole of the boot body and said base of the adapter.

5. The assembly according to claim 4, wherein said shim comprises at least one plate having a width substantially equal to the distance between the ends of the bars of the open horseshoe for which the engagement means are configured.

6. The assembly according to claim 4, wherein said shim is made of a material having a higher stiffness with respect to the material of the adapter.

7. The assembly according to claim 4, wherein said shim is made of an elastomeric material having Shore A hardness of between about 70 and about 90.

8. The assembly according to claim 1, wherein said engagement means are configured for engagement with an open horseshoe and said engagement means comprise at least two projections extending vertically from said base of the adapter and positioned so as to define a lateral abutment at inner sides of the ends of the bars of the open horseshoe.

9. The assembly according to claim 1, wherein said engagement means comprise a plurality of projections extending vertically from said base of the adapter, at least two projections of said plurality of projections being positioned so as to define a lateral abutment at inner sides of said ends of the bars of the horseshoe.

10. The assembly according to claim 1, wherein said vertical wall of the adapter comprises a V-shaped cut extending vertically from the upper edge thereof.

11. The assembly according to claim 10, wherein said vertical wall of the adapter comprises at least one eyelet on each side of the V-shaped cut for the passage of a ribbon-like element of said fastening means, each of the at least one eyelet projecting perpendicularly to said vertical wall on an external side of the vertical wall.

12. The assembly according to claim 1, wherein said adapter is made in one piece.

13. The assembly according to claim 1, wherein said adapter is made of a material having a lower stiffness with respect to the material of the boot body.

14. The assembly according to claim 1, wherein said adapter is made of an elastomeric material having Shore A hardness of between about 40 and about 70.

15. The assembly according to claim 1, wherein said boot body comprises a front portion of upper intended to come into contact with the wall of the hoof and wherein said front portion comprises, at the side facing the inside of the boot body, at least one grooved area with parallel grooves, substantially perpendicular to the edge of the upper.

16. The assembly according to claim 1, wherein said boot body comprises a front portion of upper intended to come into contact with the wall of the hoof and wherein said front portion comprises a first cut extending vertically from the upper edge thereof.

17. The assembly according to claim 1, wherein said boot body comprises a rear portion of upper having a second cut extending vertically from an upper edge thereof.

18. The assembly according to claim 17, wherein said second cut partially extends into the sole of the boot body.

19. The assembly according to claim 18, wherein the boot body comprises a diaphragm arranged at the portion of said second cut extending into the sole.

20. The assembly according to claim 1, wherein said boot body is made in one piece.

21. The assembly according to claim 1, wherein said boot body is made of an elastomeric material having a Shore A hardness of between about 70 and about 90.

22. The assembly according to claim 1, wherein said fastening means form a multiple pulley traction system.

23. The assembly according to claim 22, wherein said fastening means comprise a first ribbon-like element folded on itself having two free ends connectible at a fastening group defining a first pulley of said multiple pulley traction system, and a second ribbon-like element folded on itself and connected to said first ribbon-like element at an intermediate section and at free ends thereof through rings defining a second pulley of said multiple pulley fraction system.

24. The assembly according to claim 22, wherein said fastening means comprise one ribbon-like element folded on itself, said at least one ribbon-like element having two free ends connectible at a fastening group defining a pulley of said multiple pulley traction system, and being closed ring-wise around said boot body by means of a ring defining a second pulley of said multiple pulley traction system.

25. The assembly according to claim 23, wherein said boot body comprises openings for the passage of said fastening means.

26. The assembly according to claim 25, wherein said boot body comprises two pairs of first openings formed at a front portion of an upper and two pairs of second openings formed at a rear portion of an upper.

27. The assembly according to claim 26, wherein said first openings and said second openings are arranged symmetrically with respect to a middle longitudinal axis (A-A) of said boot body.

28. The assembly according to claim 25, wherein said fastening means are associated with said boot body so as to pass at least partially internally with respect to the boot body and externally with respect to the adapter.

29. The assembly according to claim 1, wherein the rear portion of the upper of the boot body includes a cut extending vertically from an upper edge thereof, the vertical wall of the adapter comprises at least one eyelet that projects from the vertical wall into the cut in the rear portion of the upper of the boot body, and the fastening means include a ribbon-like element that passes through the eyelet on an outer side of the adapter.

30. A horse boot assembly comprising:
a boot body shaped to accommodate a hoof of a horse provided with a horseshoe;

fastening means associated with said boot body for fastening the boot assembly onto said hoof; and an adapter being separate from the boot body and comprising an eyelet for engagement with said fastening means, wherein the fastening means engages both the boot body and the adapter and mutually connects the adapter to the boot body when the horse boot assembly is not worn, wherein said adapter comprises engagement means for engagement with said horseshoe, wherein said adapter comprises a base lying on a portion of a sole of the boot body, and a vertical wall adapted to be interposed between a rear portion of an upper of the boot body and a rear part of the hoof, the eyelet being connected to the vertical wall.

31. The assembly according to claim 30, wherein the adapter is made of a material having a lower stiffness than a material of the boot body, and the fastening means causes compression of the adapter against said read part of the hoof when the horse boot assembly is fastened to the hoof.

32. A horse boot assembly comprising:

a boot body shaped to accommodate a hoof of a horse provided with a horseshoe, the boot body having a sole with a first raised section in a central area of the sole configured to contact a portion of the hoof not covered by the horseshoe, and a second section disposed to the front and sides of the first raised section and configured to accommodate a front and sides of the horseshoe;

fastening means associated with said boot body for fastening the boot assembly onto said hoof; and an adapter distinct from and inserted in said boot body, the adapter comprising a base lying on a portion of the sole of the boot body, and a vertical wall adapted to be interposed between a rear portion of an upper of the boot body and a rear part of the hoof, wherein said adapter further comprises engagement means for engagement with said horseshoe, said engagement means are configured for engagement with an open horseshoe and said engagement means comprise a raised area in said base of the adapter, the raised area being disposed rearward of said first raised section and configured for interposition in abutment between ends of bars of the open horseshoe, wherein said adapter is compressed against said rear part of said hood upon fastening of said fastening means, and wherein said raised area if formed by a shim made of elastomeric material interposed between said sole of the boot body and said base of the adapter.

* * * * *